US006596938B2

(12) United States Patent
Gilleran

(10) Patent No.: US 6,596,938 B2
(45) Date of Patent: *Jul. 22, 2003

(54) EXTERIOR ELECTRICAL BOX WATERPROOFING SYSTEM

(76) Inventor: William J. Gilleran, 27881 Trocadero, Mission Viejo, CA (US) 92692

( * ) Notice: Subject to any disclaimer, the term of this patent is extended or adjusted under 35 U.S.C. 154(b) by 0 days.

This patent is subject to a terminal disclaimer.

(21) Appl. No.: 10/146,098

(22) Filed: May 15, 2002

(65) Prior Publication Data
US 2002/0125031 A1 Sep. 12, 2002

Related U.S. Application Data

(63) Continuation-in-part of application No. 09/725,366, filed on Nov. 29, 2000, now Pat. No. 6,395,984.

(51) Int. Cl.[7] .............................................. H01H 13/04
(52) U.S. Cl. ........................... 174/58; 174/53; 174/50; 220/3.2
(58) Field of Search ............................ 174/58, 50, 53, 174/54, 55, 56, 57, 61, 66, 67; 220/3.2, 3.3, 3.5, 3.6, 3.7, 3.8, 3.94, 241

(56) References Cited

U.S. PATENT DOCUMENTS

| 791,068 | A | | 5/1905 | Baker | |
|---|---|---|---|---|---|
| 2,800,850 | A | | 6/1957 | McKann | |
| 4,296,870 | A | | 10/1981 | Balkwill et al. | |
| 4,526,407 | A | | 7/1985 | Kifer | |
| 4,673,097 | A | * | 6/1987 | Schuldt | 220/3.2 |
| 4,757,158 | A | * | 7/1988 | Lentz | 174/53 |
| 4,794,207 | A | * | 12/1988 | Norberg et al. | 174/48 |
| 4,874,189 | A | | 10/1989 | Gardner | |
| 4,903,997 | A | | 2/1990 | Kifer | |
| 4,927,039 | A | * | 5/1990 | McNab | 174/57 |
| 4,952,754 | A | * | 8/1990 | Rye | 174/53 |
| 4,965,971 | A | | 10/1990 | Jean-Jacques et al. | |
| 5,171,939 | A | * | 12/1992 | Shotey | 174/57 |
| 5,246,255 | A | | 9/1993 | Forbes et al. | |
| 5,287,665 | A | * | 2/1994 | Rath, Jr. | 174/48 |
| 5,309,579 | A | | 5/1994 | Nelson | |
| 5,402,902 | A | * | 4/1995 | Bouley | 220/3.2 |
| 5,526,619 | A | | 6/1996 | Vagedes | |
| 5,740,936 | A | * | 4/1998 | Nash | 220/3.3 |
| 5,803,508 | A | | 9/1998 | Lowella | |
| 5,918,431 | A | | 7/1999 | Schiedegger et al. | |
| 5,931,325 | A | * | 8/1999 | Filipov | 174/57 |
| 5,946,863 | A | | 9/1999 | Bullard | |
| 6,239,365 | B1 | * | 5/2001 | McEvers | 174/50 |
| 6,395,984 | B1 | * | 5/2002 | Gilleran | 174/50 |

* cited by examiner

Primary Examiner—Dean A. Reichard
Assistant Examiner—Angel R. Estrada
(74) Attorney, Agent, or Firm—Stetina Brunda Garred & Brucker

(57) ABSTRACT

Moisture-proof flashing panel mounts for use on residential and commercial electrical junction box to be disposed within a building structure wall. The mounts are formed as a generally flat moisture-impermeable panel having therethrough an exteriorly projecting flanged opening defining a frame having an interior frame surface. The interior frame surface of the residential mount is complimentary in shape to the perimeter border of the residential junction box and is sized to allow the shaped border to reside by friction fit within the frame. The exteriorly projected flanged opening of the commercial mount simulates standard commercial single gang; 2 gang; 3/0 and 4/0 box configurations and is mounted to the junction box by plural threaded fasteners. Upon installation, the remainder of the panel is disposed lateral to the frame and is effectively covered with wall finishing material such as lath paper and stucco which is applied to also surround the outer wall of the exteriorly projecting flanged opening that forms the frame. The installation prohibits moisture entry around the junction box and into the building-structure wall.

17 Claims, 7 Drawing Sheets

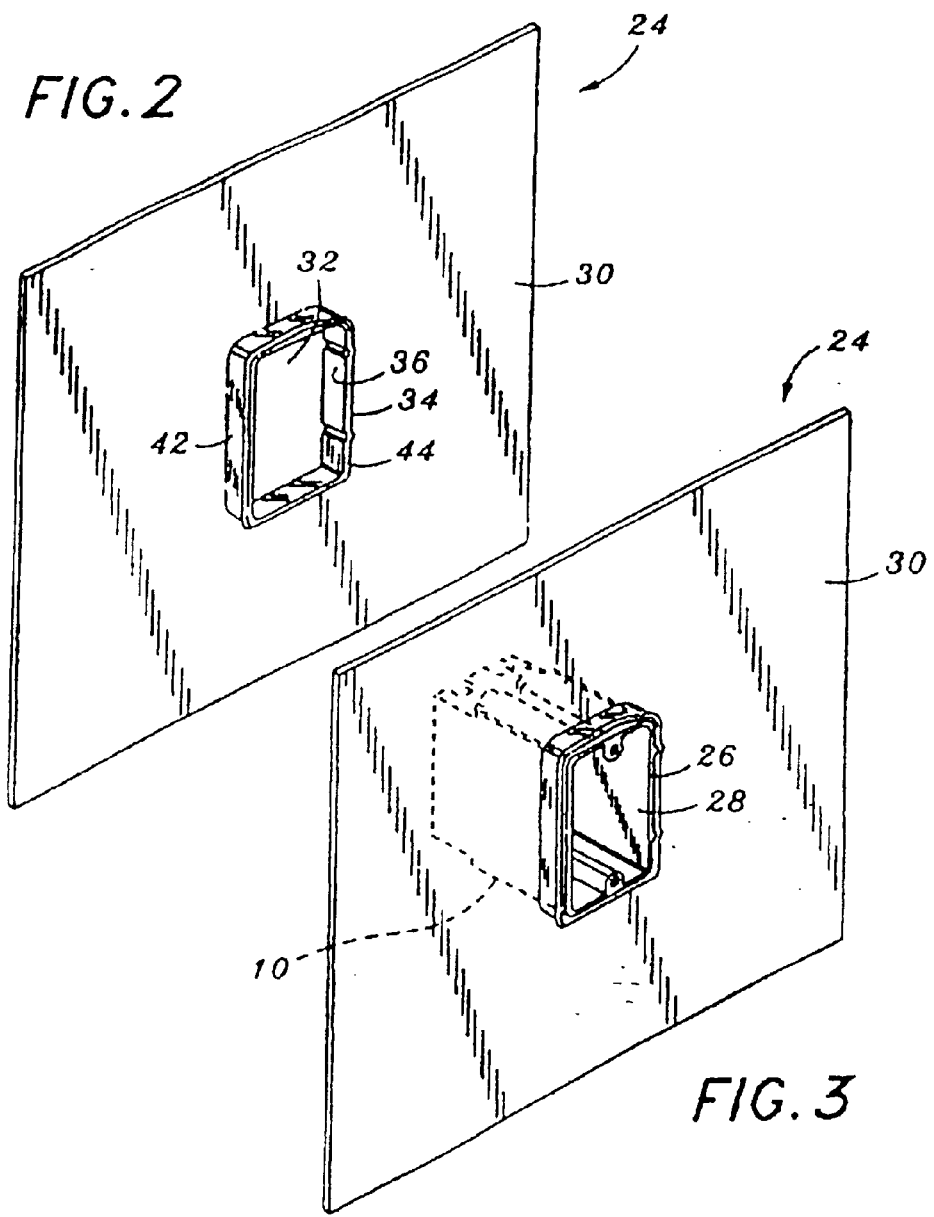

EXTERIOR ELECTRICAL BOX WATERPROOFING SYSTEM

CROSS-REFERENCE TO RELATED APPLICATIONS

The present application is a continuation-in-part of U.S. patent application Ser. No. 09/725,366 entitled SUB EXTERIOR WEATHERPROOF FLASHING PANEL MOUNT FOR ELECTRICAL JUNCTION BOX filed Nov. 29, 2000, now U.S. Pat. No. 6,395,984 the entirety of the disclosure of which is expressly incorporated herein by reference.

STATEMENT RE: FEDERALLY SPONSORED RESEARCH/DEVELOPMENT (Not Applicable)

BACKGROUND OF THE INVENTION

The present invention relates generally to external mounting frames positioned around an exterior oriented electrical junction box, and more particularly to a moisture-resistant flashing panel mount which is adapted for a residential and/or commercial electrical junction box so as to prohibit passage of water around the box and into the wall of a residential and/or commercial building.

In view of potentially untoward consequences that can develop upon the entry of water into the interior of a residential and/or commercial building structure, it is extremely important that vulnerable areas such as those surrounding exterior electrical junction boxes disposed within external building walls be weatherproofed to prohibit undesirable moisture entry into the building structure. As is recognized, such water entry, whether from rain, snow, mis-directed lawn sprinklers, or vandalism, can literally ruin floors, walls, ceilings, etc., within a building as the water travels within the hidden inner portions of the structure.

In order to alleviate such problem, lath paper has been applied in layers over the entire vertical surface exterior walls of a residential and/or commercial building with the lath affixed to the wall frame members, such as wood studs for example. The lath paper is either cut out or torn out around the exterior electrical junction box. Caulking is then typically applied at interface sites of the electrical junction box and lath paper in an effort to weather-proof the exterior junction box. Then, conventional exterior wall finish materials such as stucco, wood, brick, etc., are used to cover or finish the outside of the residential and/or commercial building structure.

If the installer of the lath paper does not properly apply the caulk to the electrical box/lath interface to form a weather-proof seal, the installation is immediately flawed and water entry can occur shortly after completion. Where the paper and caulk applications are acceptable, the treatment may be effective at first, but through application of stucco and/or wood siding or through the passage of time and the accompanying environmental influences, the caulk compound oftentimes cracks and eventually breaks away. Thereafter, environmental moisture can easily enter the building from the cracks and voids formed around the electrical junction box and eventually causes severe water damage as described above within the building structure.

In view of the costly damage that can occur because of water intrusion, it is apparent that a need is present for effective and long-lasting moisture protection that can be quickly and properly installed during the building process and remain viable for the life of the structure. Accordingly, a primary object of the present invention is to provide a moisture-proof flashing panel mount for use on a residential electrical junction box that can be readily installed in a free-floating manner, and also in an additional embodiment for use on a commercial electrical junction box which can be easily installed via fasteners. These panel mounts can be installed without installation error and be fully integrateable with conventional exterior finish materials.

Another object of the present invention is to provide a flashing panel mount wherein an otherwise flat rigid waterproof panel has therethrough a protruding flange or frame for housing the front-most portion of the electrical junction box to thereby create an external moisture impervious barrier over which lath paper and an exterior finish material can be applied while insuring a moisture barrier around the electrical box.

These and other objects of the present invention will become apparent throughout the description thereof which now follows.

BRIEF SUMMARY OF THE INVENTION

The present invention comprises a moisture-resistant flashing panel mount for use on an exterior electrical junction box to be disposed within a residential and/or commercial building structure wall. The mount preferably comprises a one-piece generally flat and generally rigid or semi-rigid moisture-impermeable panel having an exteriorly projecting flanged opening. Although this opening is defined about the central area of the panel, it should be recognized that the opening may be positioned at any given location thereof.

With respect to the flashing panel mount adapted for residential electrical junction box, the exteriorly projecting flanged opening defines a frame or flange having an interior frame surface. This interior frame surface is formed to be complimentary in shape to the shaped outside perimeter or border of the electrical junction box and is sized to allow the shaped border to reside by friction fit within the frame. More specifically, by utilizing such complimentary interior frame surface, the flashing panel mount may simply slide on and frictionally engage the outer perimeter of the electrical junction box and be maintained thereon in a free-floating manner. By free-floating, it is meant that the flashing panel mount can easily self-engage and be self-mounted to the electrical junction box without the need for any auxiliary attaching means such as nails, screws, and the like.

In an additional embodiment of the moisture-proof flashing panel mounts specifically designed for commercial electrical junction boxes, the mount includes a frame which forms a variety of differently sized and shaped exteriorly projecting flanged openings each sized to cooperate industry-standard single-ganged, double-ganged, 3/0 and/or 4/0 commercial junction boxes. Preferably, the panel mount is attached to the commercial junction box by aligning its two diagonally opposed fastener holes with the corresponding fastening holes of the commercial junction box in which fasteners such as screws are threaded therethrough.

For both residentially and commercially applied panel mounts, the remainder of the panel is disposed lateral to the frame and is effectively covered with wall finishing material such as lath paper and stucco and/or siding which is applied to also surround the outer wall of the exteriorly projecting lip that forms the frame. It is to be noted that building codes generally require that such wall finishing material, as well as perhaps any other structure which would include the present inventive flanged frame, cannot overlap the electrical junction box opening border because of possible contact with the electric utility contained within the electrical box. As will become more apparent below, the installation above-described prohibits moisture entry around and into the building-structure wall adjacent the electrical junction box, with such moisture entry prohibition continuing for the life of the building structure.

BRIEF DESCRIPTION OF THE DRAWINGS

These as well as other features of the present invention will become more apparent upon reference to the drawings wherein:

FIG. 2 is a perspective view of a moisture-resistant flashing panel mount constructed in accordance with a first preferred embodiment of the present invention specifically adapted for use on a conventional residential electrical junction box such as the one depicted in FIG. 1;

FIG. 3 is a perspective view of the flashing panel mount of FIG. 2 positioned upon the residential electrical junction box;

DETAILED DESCRIPTION OF THE PREFERRED EMBODIMENTS

Figure 1:
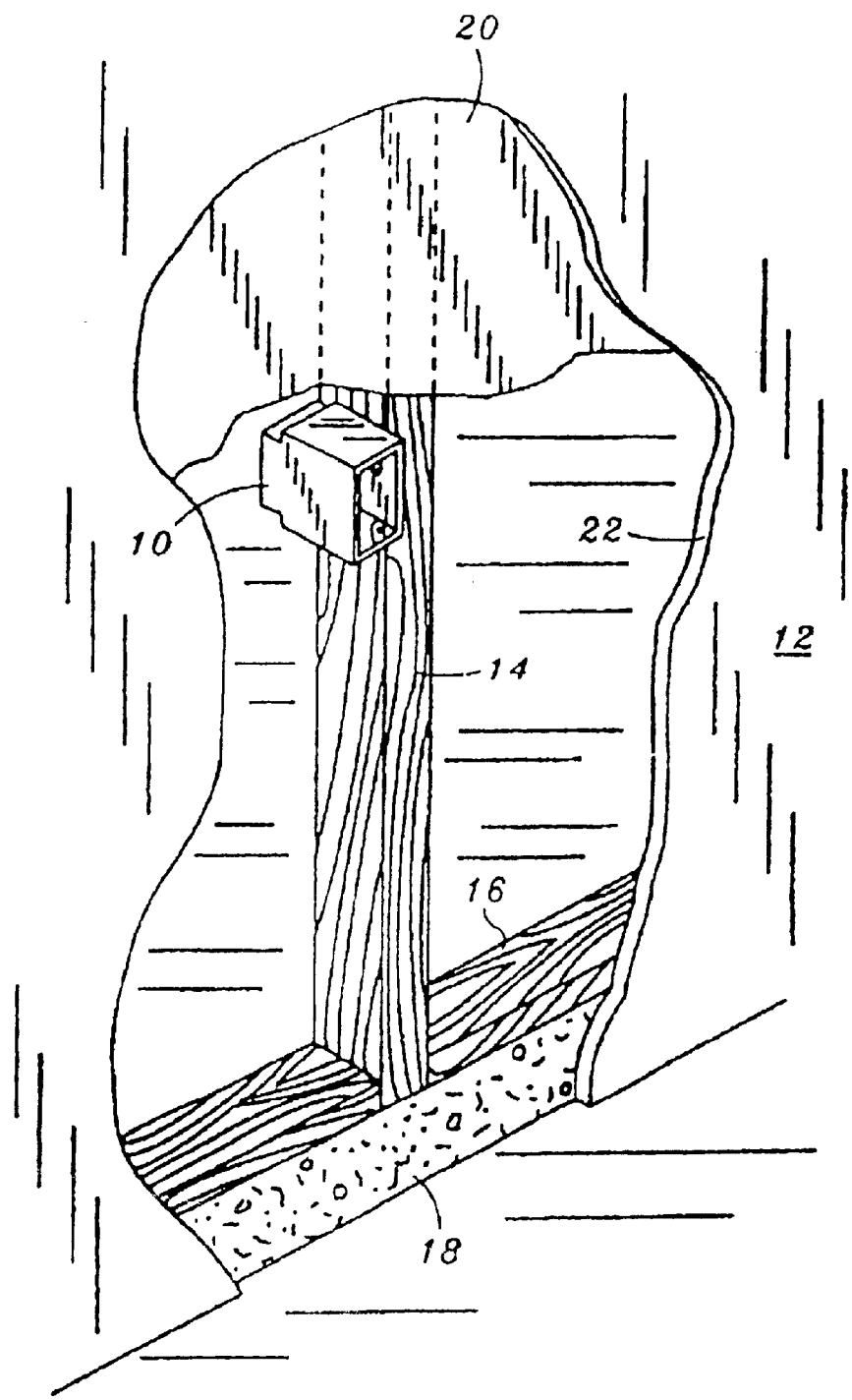
FIG. 1 is a perspective cut-away view of an exemplary prior art electrical junction box mounted within a residential wall structure.

Referring now to the drawings wherein the showings are for purposes of illustrating preferred embodiments of the present invention only, and not for purposes of limiting the same, FIG. 1 perspectively illustrates an exemplary prior art residential electrical junction box 10 that is standard in the industry. This electrical junction box 10 is shown in a prior art conventional mount configuration positioned on the exterior side of a wall 12, nailed to a standard two-by-four wood stud 14 extending upwardly from a base frame member 16 positioned on a concrete foundation 18. However, use on conventional metal studs is expressly contemplated herein.

Further illustrated in FIG. 1, there are provided conventional exterior wall finish materials such as lath paper 20 and stucco 22 for finishing the wall 12. In a standard prior art installation, a plurality of layers of lath paper 20 typically would be brought to the borders of the electrical junction box 10. Although not mandatory, typically caulking would be applied between the peripheral edges of the junction box 10 and the lath paper. Thereafter the stucco 22 or wood siding would be applied likewise to the borders of the residential junction box 10. A caulk bead (not shown) would then be applied along the borders of the junction box 10 at the intersection with the stucco 22.

Figure 4:
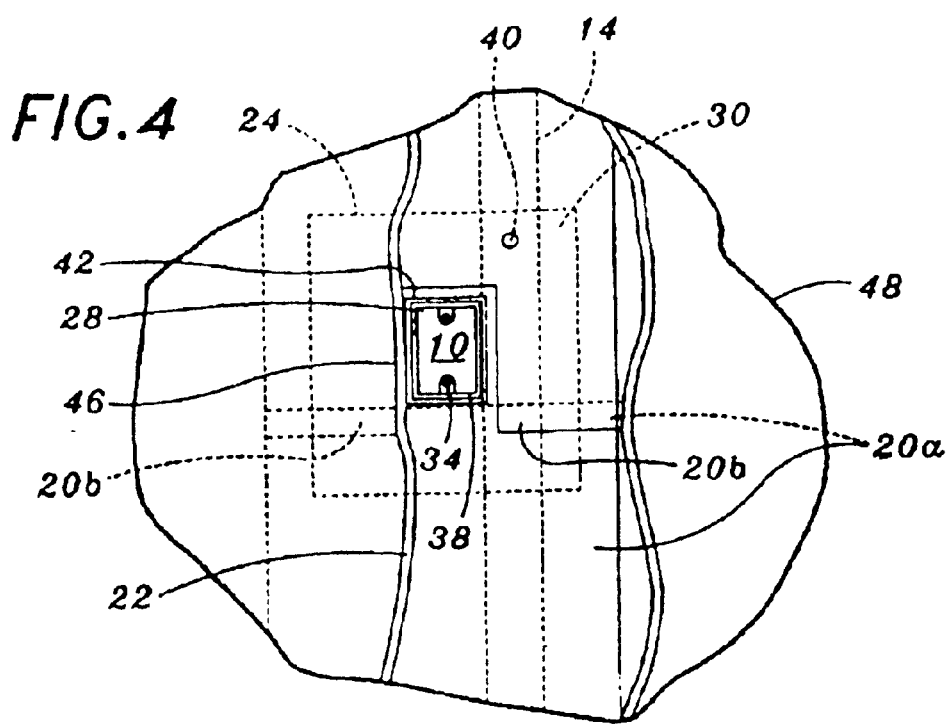
FIG. 4 is an elevation cut-away view of a portion of the residential wall structure of FIG. 1 illustrating the installation of the moisture-proof flashing panel mount of FIG. 2 within a wall.

Referring now to FIGS. 2–4, the present invention provides for a moisture-proof flashing panel mount 24. This flashing panel mount 24 is specifically adapted for the residential electrical junction box 10 which is disposed within a building structure wall 48 (as shown in FIGS. 1 and 3). It will be contemplated by a person of ordinary skill in the art that the flashing panel mount 24 may be formed to have a variety of shapes, configurations, geometries and sizes other than for that shown in the provided figures. Furthermore, it should be noted that the residential junction box 10 (as shown in FIGS. 1, 3 and 4) is an exemplary one typically used within any residential building structure wall 48. As shown by those same figures, the residential electrical junction box 10 has a shaped perimeter border 26 defining an exteriorly accessible opening 28 for accommodating electrical wiring (not shown).

The mount 24 preferably comprises a one-piece generally flat and generally rigid or semi-rigid moisture-impermeable panel 30 preferably formed of a molded polymer material such as polyvinylchloride (PVC). Although the panel 30 is shaped in a rectangular configuration, such depiction is exemplary in nature and should not be limited thereto. One of ordinary skill in the art will easily recognize that other shapes yielding large surfaces are workable since it is the idea of creating an enlarged moisture-impervious parameter around the electrical junction box 10 that should be appreciated.

The moisture-impermeable panel 30 has an exteriorly projecting flanged opening 32 therethrough. Although this opening 32 is defined about the central area of the moisture-impermeable panel 30, it should be recognized that such opening 32 may be positioned at any given location thereof. The panel 30 and flanged opening 32 can alternatively be formed as two separate members. For example, the moisture-impermeable panel may merely include an opening and the exteriorly projecting flange can be formed by a separate and independent structure being inserted therethrough.

The exteriorly projecting opening 32 defines a frame or flange 34 having an interior frame surface 36. The interior frame surface 36 is formed to be complimentary in shape to the perimeter border 26 of the residential electrical junction box 10, and is sized such that the border 26 can reside by friction fit within the frame 34. More specifically, by utilizing this complimentary interior frame surface 36, the flashing panel mount 24 may simply slide on and sealingly engage the electrical junction box 10 in a free-floating manner.

By free-floating, the flashing panel mount 24 can easily self-engage and be self-mounted to the residential electrical junction box 10 without the need for any outside attaching means such as nails, screws, and the like (as shown in FIG. 3). In this respect, the exteriorly projecting flanged opening 32 should be sufficiently sized so that its interior frame surface 36 may readily accommodate a variety of residential electrical junction boxes.

In the preferred embodiment, the flange opening 32 includes an outwardly extending raised lip 37 which preferably extends completely about its perimeter. The raised lip deters any water which runs down the exterior wall surface from migrating over the open end of the flange and into the interior of the junction box when the junction box includes a conventional exterior cover thereon (not shown). Although the raised lip is preferable, it is not required for proper moisture sealing and can be eliminated if desired.

Figure 5:
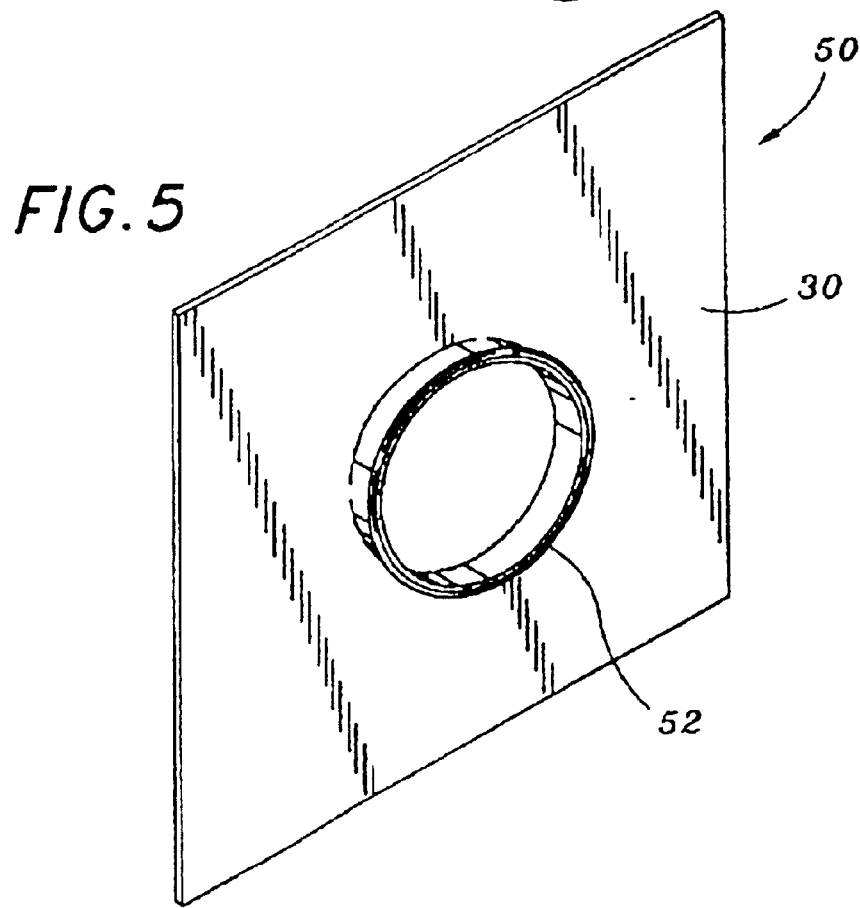
FIG. 5 is a perspective view of a residential moisture-resistant flashing panel mount constructed in accordance with the present invention adapted for use with a different-shaped conventional residential 3/0 electrical junction box.

The flanged opening 32 and the interior frame surface 36 which is defined thereby may vary depending upon the size and shape of the particular conventional residential electrical junction box 10 (as to its outer peripheral shaped border 26). For instance, as exemplified in FIG. 5, when a residential electrical junction box 10 defines a circular outer shaped border typically known as a 3/0 (3 inches round) and/or 4/0 (4 inches round) box the moisture-proof flashing panel mount 50 may be provided for which can slidably and frictionally engage the circular shaped border in a free-floating manner within the frame 52 of the mount 50. Similarly, two-gang electrical box configurations are expressly contemplated.

Figure 6:
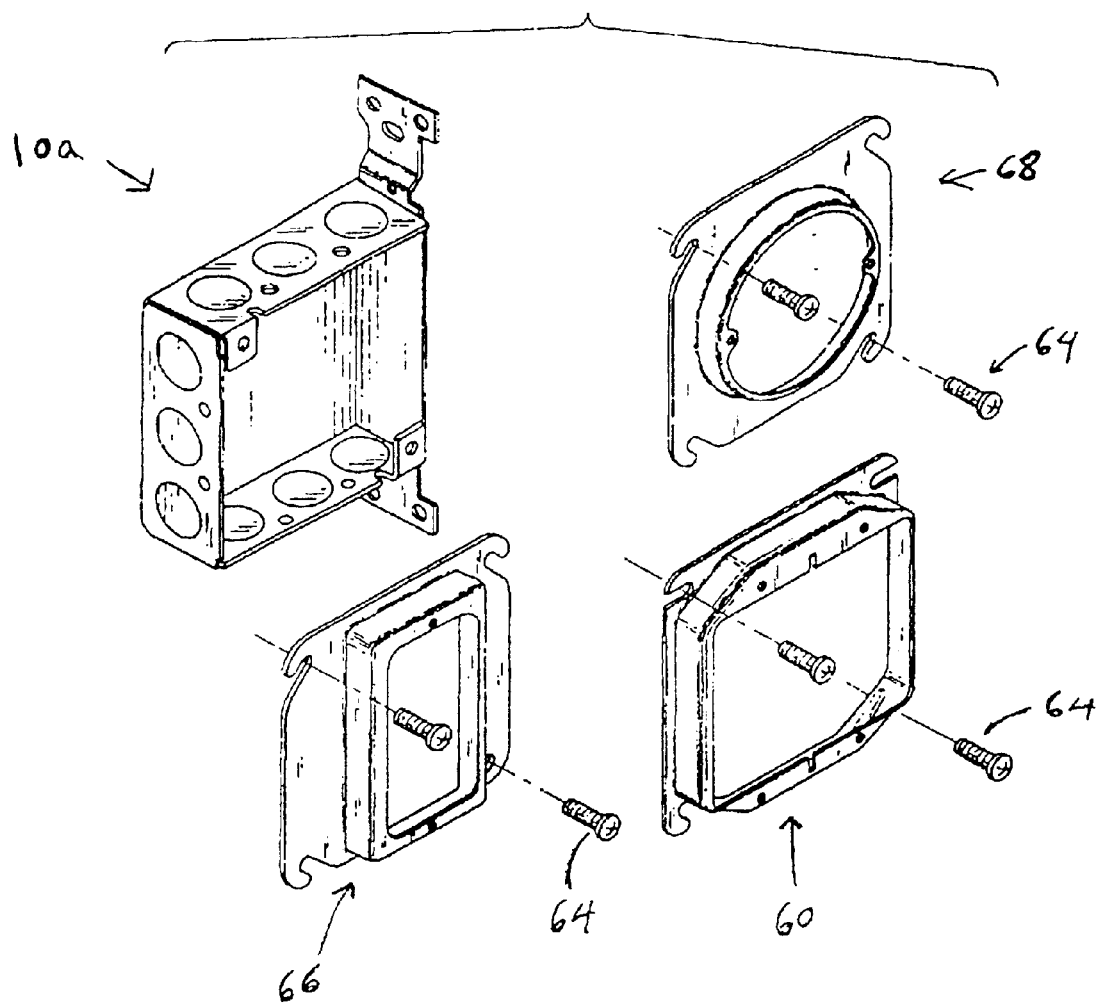
FIG. 6 is a perspective view of an exemplary conventional prior art 4/S commercial electrical junction box which is sized and configured to engage either a single-gang, two-gang or a 3/0 frontal face cover portion via screws.

FIG. 6 provides detailed illustrations of a standard prior 4/S (4 inches square) commercial electrical junction box 10a which may be primarily used for commercial applications. As is well known the 4/S box typically is utilized with one or more cover plates or portions which define industry standard electrical box configurations. It should be noted herein that the present invention may be utilized with other types of commercial electrical junction boxes such as the 5/S (5 inches square) junction box other than for that shown in that Figure.

One such typical commercial electrical junction box 10a configuration that may be formed is a two-gang electrical junction box 60. This commercial electrical junction box may be formed by mounting exposed frontal cover portion 60 thereto via threaded fasteners 64. There may also be provided a single-gang electrical junction box 10a which may be formed by mounting the frontal portion 66 thereto. There is further provided a 3/0 and/or 4/0 electrical junction box formed by mounting a circular, exposed frontal cover portion 68 with the standard commercial junction box 10a via fasteners 64.

Referring now to FIGS. 6–9, a second embodiment of the moisture-proof flashing panel mounts 24 specifically adapted to be used in conjunction with a standard 4/S commercial junction box 10a is depicted. These panel mounts 24 are substantially similar in structure and function to the above-described panel mounts 24, applied on the residential electrical junction box 10. However, the primary difference lies in the size of the exteriorly projecting flanged opening 32 and the manner of engagement i.e. mounting with their respective electrical junction boxes 10a.

Figure 7:
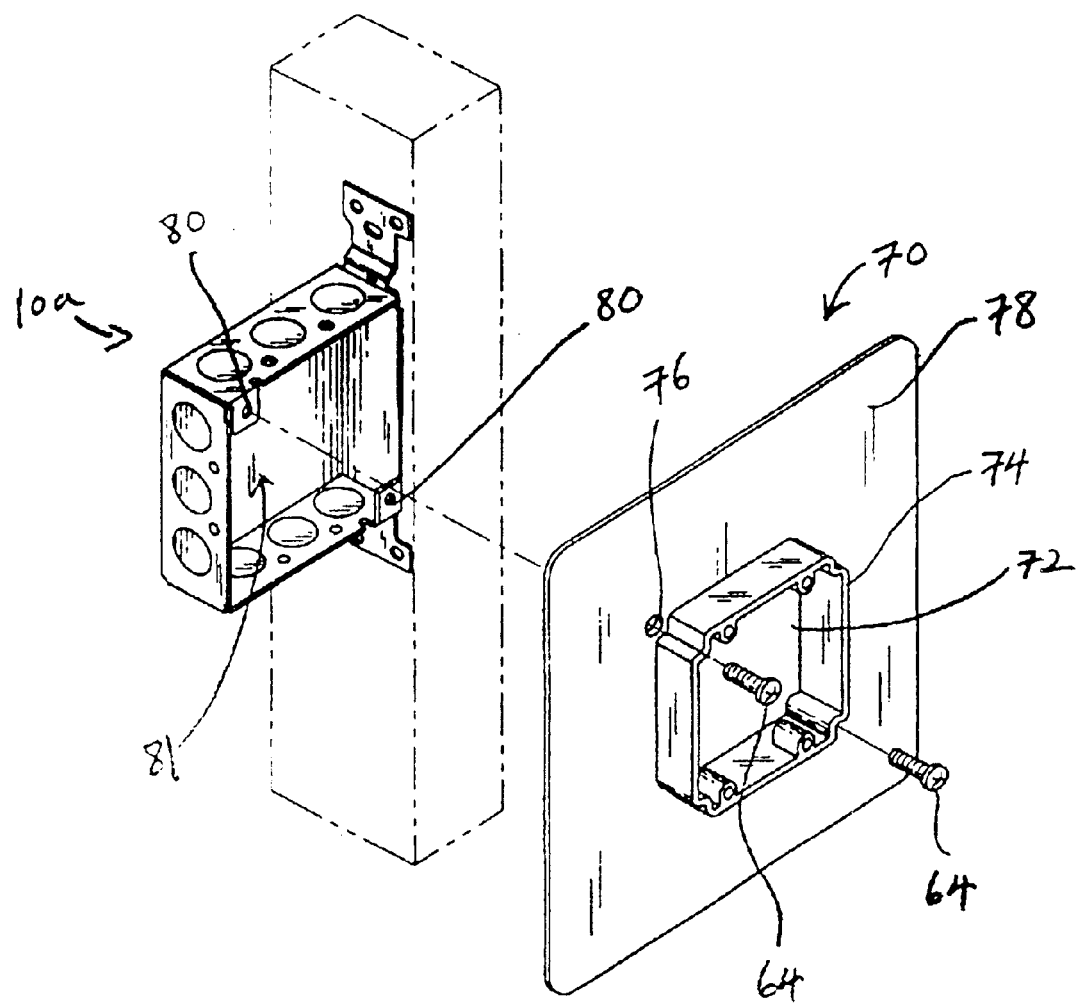
FIG. 7 is a perspective view of a second embodiment of the moisture-resistant flashing panel mount specifically adapted to be engaged with the conventional 4/S commercial electrical junction box of FIG. 6 via screws, and illustrating its exteriorly projecting opening which simulates the opening of a two-gang frontal cover portion shown in FIG. 6.

More specifically, as shown in FIG. 7, there is shown a flashing panel mount 70 constructed in accordance with the second embodiment of the present invention adapted for use as a two-gang box. This panel mount 70 comprises an exteriorly projecting flanged opening 72 which is made in a similar fashion as the flanged opening 32 of the first embodied panel mount 24. Such opening 72 is configured to simulate the opening of the two-gang frontal cover portion 60 (shown in FIG. 6). Although not required, the third embodied flashing panel mount 70 may define indentations on the corner edges of the frame or flange 74 forming the exteriorly projecting opening 72. Adjacent to the corner edges of the frame 74, or the indentations thereof if present, fastener holes 76 may be defined through the moisture-impermeable panel 78 of the flashing panel mount 70. Preferably, there are only two fastener holes 76 which are diagonally opposed to each other and correspond to be registered or aligned with the two fastening holes 80 formed on the commercial junction box 10a. In this respect, fasteners 64 (e.g., screws, nails, rivets) may be threadingly extended through the corresponding fastener and fastening holes 76, 80 formed attachment between the flashing panel mount 70 and the commercial junction box 10a. As such, the exteriorly projecting opening 72 may provide a defined two-gang entrance to the interior 81 of the commercial electrical junction box 10a.

Figure 8:
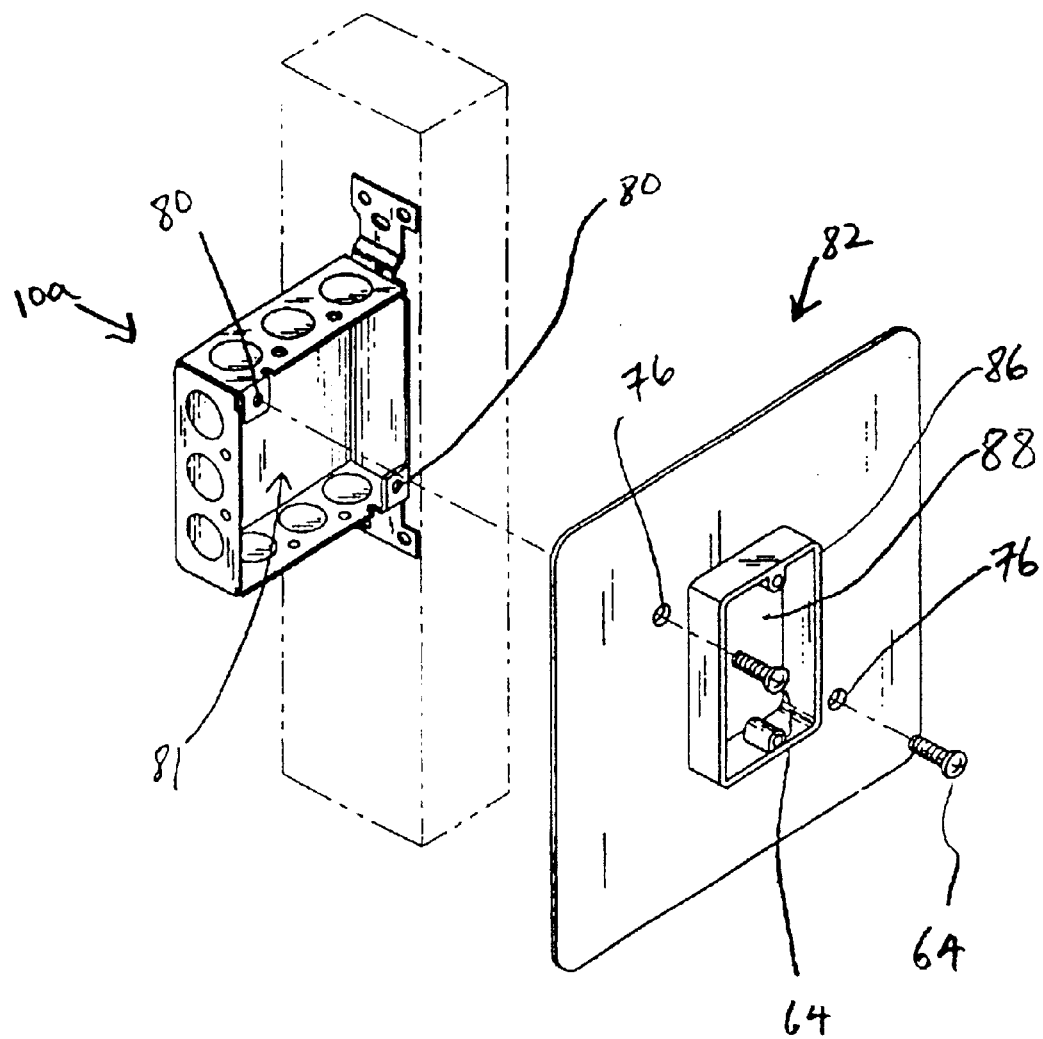
FIG. 8 is a perspective view of a moisture resistant flashing panel mount constructed in accordance with the second preferred embodiment of the present invention adapted to be engaged with the 4/S commercial electrical junction box of FIG. 6 via screws, illustrating its exteriorly projecting opening which simulates the opening of a single-gang frontal cover portion of FIG. 6.

FIG. 8 illustrates a moisture resistant flashing panel mount 82 which is constructed in accordance with the second embodiment of the present invention adapted for use as a single-gang box. This panel mount 82 is substantially identical to the mount 70 in that its moisture-impermeable panel 84 includes the same fastener holes 76 for attachment to the commercial junction box 10a in a like manner. However, its frame or flange 86 forms an exteriorly projecting opening 88 which is generally smaller in size than the projecting opening 72 of the panel mount 70 and specifically sized and configured to define a single-gang box configuration.

Figure 9:
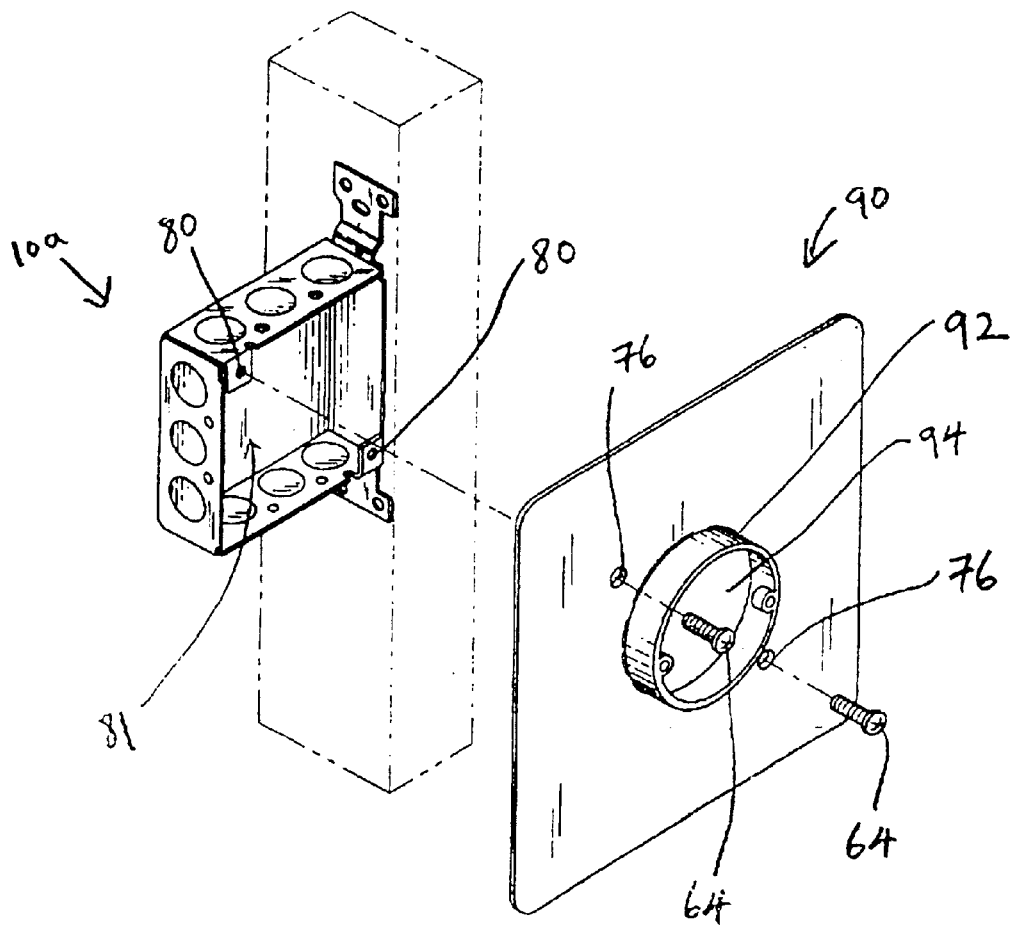
FIG. 9 is a perspective view of a moisture resistant flashing panel mount constructed in accordance with the second embodiment of the present invention specifically adapted to be engaged with the 4/S commercial electrical junction box of FIG. 6 via screws, and illustrating its exteriorly projecting opening which simulates the opening of the 3/0 frontal cover portion shown in FIG. 6.

Referring now to FIG. 9, a panel mount 90 is shown comprising a frame or flange 92 forming an exteriorly projecting opening 94 which simulates the opening of the 3/0 and/or 4/0 frontal cover portion 68 (best shown in FIG. 6). In this regard, the panel mount 90 may be engaged to the commercial junction box 10a via fasteners 64 extending through its two formed fastener holes 76 to provide a defined entrance to the interior 81 of the commercial electrical junction box 10a.

With the structure defined and referring more particularly to FIG. 4, the installation of the moisture-resistant flashing panel mount 24 upon a residential electrical junction box 10 mounted upon the wall structure may be described. It should be noted that the following application of the first embodiment panel mount 24 is exemplary for use of all other embodied panel mounts 50, 70, 82, 90. In this respect, it is emphasized that the structure wall 48 as defined herein may be for that of any residential and/or commercial walled structures (e.g., houses, apartments, office buildings, factory buildings, warehouses, and the like). Specifically, the residential mount 24 or 50 is first positioned adjacent the junction box 10 with the flanged opening 34 being registered with the perimeter border 38 of the junction box 10. Subsequently, the mount 24 may be frictionally pressed over the box 10 with the frame 34 thereof around and flush with the border 38 of the electrical junction box 10. Optionally, a nail or fastener 40 may be driven through and near the top of the panel 30 into the stud 14 (as shown in FIG. 4). As discussed above, the preferred mode of engaging the flashing panel mount 24 and the electrical junction box 10 together is via free-floating (as shown in FIG. 3) with the mount 24 be maintained in a sealing engagement with the box 10 by friction fit.

In contrast, the commercial panel mounts 60, 66 and 68 are aligned with the commercial 4/S box 10a and are mounted there to via threaded fasteners 64.

Once mounted upon the junction box, a first lath paper 20a is then brought from below and positioned under the flashing panel mount 24 as shown to extend vertically upward to approximately the bottom edge of the electrical junction box 10. Subsequently, a second lath paper 20b is brought from above the mount 24 to extend across the face of the mount 24 with a cut-out being formed for the opening 28 of the frame 34 and thus exposed opening 28 of the junction box 10. Thereafter, lath and stucco 22 or conventional siding is conventionally applied over the lath paper 20b, as the panel 30 provides backing for such stucco application, to terminate against the outside wall 42 of the frame 34 to be flush with the border 38 thereof.

Upon completion of the installation and finishing of the wall, a moisture resistant junction is made between the electrical junction box 10 and the flashing panel mount 24. More specifically, upon the exterior of the residential and/or commercial wall 48 confronting moisture such as rain or irrigation water, the water may travel downwardly on the exterior of the stucco wherein it confronts the upper flanged surface of the frame 34 of the panel mount 24. Due to the preferably slight inclination, i.e., gabled configuration of the upper surface of the frame 34, water is channeled laterally outward and downwardly along the frame 34. The optional outer lip 37 serves to prevent excess moisture from traveling over the lip and into the electrical junction box 10. With the water being diverted laterally outward around the electrical junction box 10, the water travels outwardly of the lath paper downwardly along the exterior of the wall 48 and subsequently into the ground. As such, a weather resistant interface between the electrical junction box 10 and the wall 48 is formed which is not subject to failure due to installation error or reliance upon caulking.

Those skilled in the art will recognize that the water resistant/moisture-proofing flashing panels of the present invention may be formed having differing sizes and configurations for that associated with each of industry standard conventional electrical junction boxes 10. Further, although in the preferred embodiment the flashing panel 24, 50 is formed as a separate member for affixation to a conventional electrical junction box 10, those skilled in the art will recognize that the flashing panel 24, 50 can be formed as an integral portion of the electrical junction box 10 if desired.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A moisture-resistant flashing panel mount adapted for an electrical junction box disposed about an exterior of a walled structure, the electrical junction box having a perimeter border, the panel mount comprising:
   a panel sized and configured to be impermeable to water, the panel having first and second surfaces;
   an opening defined through the panel between the first and second surfaces, the opening being complimentary in shape to the perimeter border of the electrical junction box disposed about the exterior of the walled structure; and
   a flanged frame surrounding the opening at the first surface of the panel and extending outwardly therefrom;
   wherein the electrical junction box is insertable through the opening of the panel from the second surface to be sealingly retained within the flanged frame.

2. The panel mount of claim 1 wherein the walled structure is a residential house.

3. The panel mount of claim 1 wherein the panel has a generally flat configuration.

4. The panel mount of claim 1 wherein the panel and the flanged frame are each fabricated from a plastic material.

5. The panel mount of claim 1 wherein the flanged frame has an interior frame surface and the electrical junction box has a shaped border, the interior frame surface being complimentary in shape to the shaped border of the electrical junction box.

6. The panel mount of claim 5 wherein the interior frame surface is four-sided in shape.

7. The panel mount of claim 5 wherein the interior frame surface is generally circular in shape.

8. The panel mount of claim 5 wherein the electrical junction box is slidably engageable within the interior frame surface of the flanged frame.

9. The panel mount of claim 5 wherein the electrical junction box is frictionally retained within the interior frame surface of the frame.

10. A wall mounting system for an electrical junction box, the system comprising:
    a) an electrical junction box adapted to be mounted to an exterior of a walled structure, the electrical junction box having an exteriorly accessible opening thereto through a shaped border defining said opening; and
    b) a moisture-resistant flashing panel mount comprising a one-piece generally flat and generally rigid moisture-impermeable panel having therethrough an exteriorly projecting opening defining a frame having an interior frame surface and an exterior frame surface, the interior frame surface complimentary in shape to the shaped border of the mounted junction box, with the shaped border residing by friction fit within the frame.

11. The system of claim 10 wherein the electrical junction box is four-sided.

12. The system of claim 10 wherein the electrical junction box is generally circular.

13. A method of installing a moisture-resistant flashing panel mount to prevent water passage into a walled structure, the panel mount having an opening and a flanged frame, the panel mount comprising:
    a) defining an electrical junction box disposed about an exterior of the walled structure, the electrical junction box having a perimeter border;
    b) inserting the electrical junction box through the opening of the panel mount, the opening being complimentary in shape to the perimeter border;
    c) sealingly retaining the electrical junction box within the flanged frame of the panel mount; and
    d) applying an exterior wall finish adjacent the flanged frame and covering the panel mount so as to prevent water passage around the electrical junction box and into the walled structure.

14. The method of claim 13 wherein the walled structure is a residential building.

15. The method of claim 13 wherein the panel mount is fabricated from a plastic material.

16. The method of claim 13 wherein the flanged frame has an interior frame surface for frictionally retaining the electrical junction box.

17. The method of claim 13 wherein the exterior wall finish comprises lath paper and stucco.

* * * * *